United States Patent
Lauxtermann

(10) Patent No.: US 7,538,307 B1
(45) Date of Patent: May 26, 2009

(54) CHARGE MULTIPLICATION CMOS IMAGE SENSOR AND METHOD FOR CHARGE MULTIPLICATION

(75) Inventor: Stefan Lauxtermann, Camarillo, CA (US)

(73) Assignee: Teledyne Licensing LLC, Thousand Oaks, CA (US)

( * ) Notice: Subject to any disclaimer, the term of this patent is extended or adjusted under 35 U.S.C. 154(b) by 0 days.

(21) Appl. No.: 12/033,786

(22) Filed: Feb. 19, 2008

(51) Int. Cl.
*H01J 40/14* (2006.01)
(52) U.S. Cl. ..................................... 250/207
(58) Field of Classification Search ................. 250/207
See application file for complete search history.

(56) References Cited

U.S. PATENT DOCUMENTS 7,139,023 B2 * 11/2006 Hynecek ..................... 348/303

* cited by examiner

*Primary Examiner*—Seung C Sohn
(74) *Attorney, Agent, or Firm*—Ehab M. Samuel; Greenberg Traurig LLP

(57) ABSTRACT

A pixel for a CMOS photo sensor having a photosensitive element configured to collect charge when light strikes the photosensitive element, a charge-multiplication circuit having a first electrode, a second electrode, and a third electrode, the charge-multiplication circuit is configured to transfer the charge from the photosensitive element to the first electrode, apply a predetermined voltage to the second electrode to induce charge multiplication, transfer the charge from the first electrode to the second electrode for charge multiplication, and transfer a plurality of charge from the second electrode to the third electrode and onto a sense node, and a readout circuit coupled to the sense node, the readout circuit measures a voltage corresponding to the plurality of charge transferred to the sense node.

19 Claims, 4 Drawing Sheets

CHARGE MULTIPLICATION CMOS IMAGE SENSOR AND METHOD FOR CHARGE MULTIPLICATION

BACKGROUND

This disclosure relates to CMOS image sensors. More particularly, the invention relates to a charge multiplication CMOS image sensor and method for charge multiplication in the image sensor.

SUMMARY

A pixel for a CMOS photo sensor having a photosensitive element configured to collect charge when light strikes the photosensitive element, a charge-multiplication circuit having a first electrode, a second electrode, and a third electrode, the charge-multiplication circuit is configured to transfer the charge from the photosensitive element to the first electrode, apply a predetermined voltage to the second electrode to induce charge multiplication, transfer the charge from the first electrode to the second electrode for charge multiplication, and transfer a plurality of charge from the second electrode to the third electrode and onto a sense node, and a readout circuit coupled to the sense node, the readout circuit measures a voltage corresponding to the plurality of charge transferred to the sense node.

In one embodiment, the pixel may include a transfer gate adjacent the photosensitive element, for transferring charge from the photosensitive element to the first electrode of the charge-multiplication circuit and for providing electrical isolation between the charge-multiplication circuit and the photosensitive element. The pixel may also include a fourth electrode adjacent the third electrode, for transferring the plurality of charge from the third electrode to the sense node.

According to a feature of the present disclosure, a method for charge multiplication in an image sensor is disclosed. The method includes collecting a charge when light strikes the photosensitive element, transferring the charge from the photosensitive element to the first electrode, applying a predetermined voltage to the second electrode to induce charge multiplication, transferring the charge from the first electrode to the second electrode for charge multiplication, transferring a plurality of charge from the second electrode to the third electrode, and transferring the plurality of charge to the sense node to generate a corresponding readout voltage.

According to one embodiment, the method includes transferring the plurality of charge back and forth, at least once, from the third electrode to the second electrode for additional charge multiplication, prior to the step of transferring the plurality of charge to the sense node to generate a corresponding readout voltage. Additionally, the method includes initializing the sense node using a predetermined voltage potential from the readout circuit prior to the step of transferring the signal charge to the sense node.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the present invention will be described in reference to a preferred embodiment that provides an apparatus and method for charge multiplication in a complementary metal oxide semiconductor ("CMOS") image or photo sensor for low noise charge domain amplification. The present invention, however, is not limited to any particular imaging application nor is it limited by the examples described herein. Therefore, the description of the embodiments that follow are for purposes of illustration and not limitation.

In one embodiment, charge multiplication, such as electron multiplication, may be achieved by applying a high voltage bias on one or more electrodes, thereby providing sufficient energy to trigger electrons into avalanching. The excited electrons, moving around with high energy, may knock out valence electrons in the crystalline structure of a CMOS device. This initiates an avalanche process causing charge multiplication.

Figure 1:
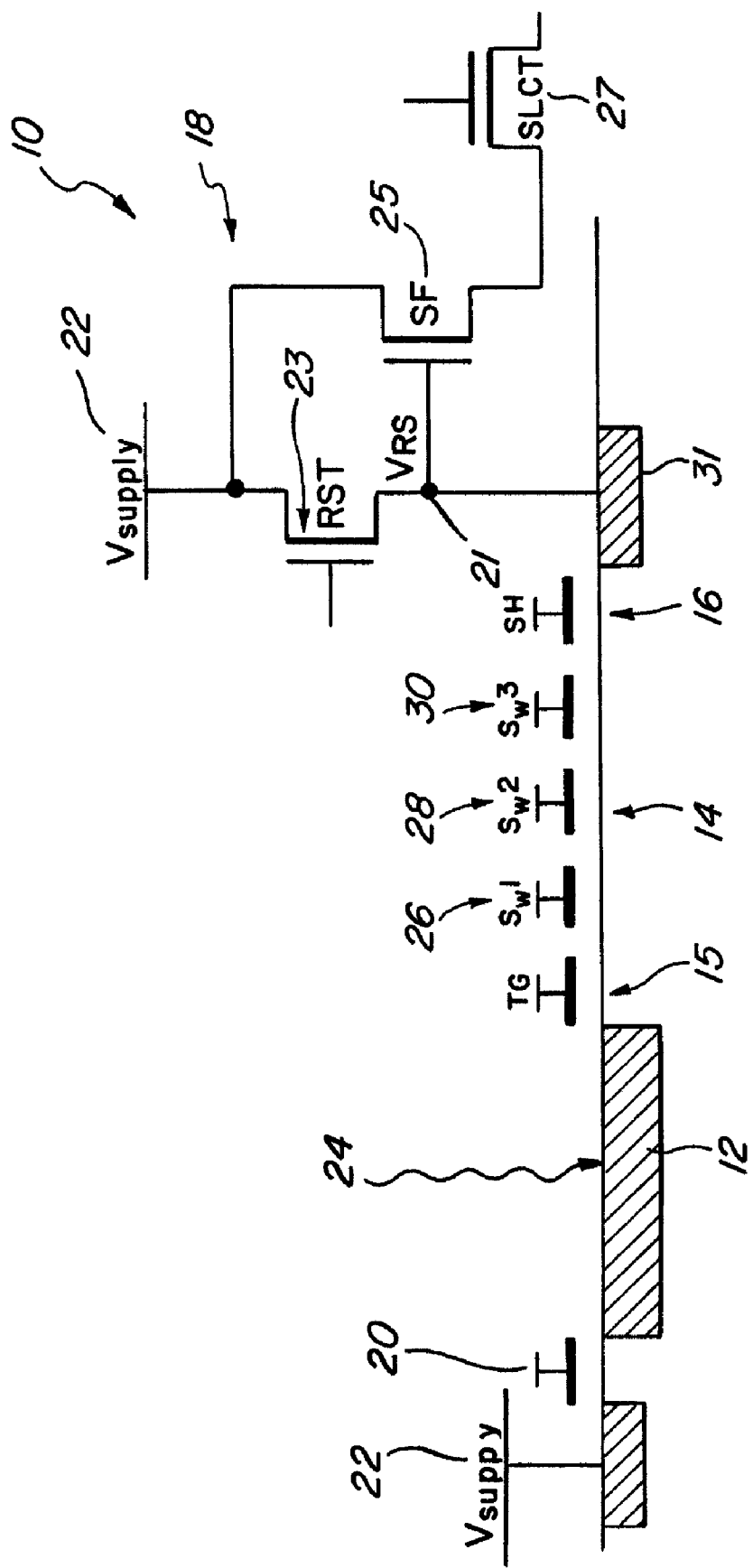
FIG. 1 is a charge multiplication CMOS photo sensor, according to an embodiment of the invention.

According to an embodiment of the invention, charge multiplication may be implemented in a CMOS photo sensor 10 as shown in FIG. 1. The CMOS photo sensor 10 may include a plurality of pixels, each pixel having a photosensitive element 12, a charge-multiplication circuit 14, a readout circuit 18 and a reset gate 20.

The photosensitive element 12 may be configured to collect charge when light 24 strikes the photosensitive element 12. The photosensitive element 12 may be a front illuminated photodiode, a backside illuminated photodiode, an avalanche photodiode, a pinned photodiode or a photo gate. The photosensitive element 12 may be coupled to the readout circuit 18 via the charge-multiplication circuit 14 and sense node 21. Signal charge may be transferred to the charge-multiplication circuit 14, while excess charge may be drained by reset gate 20.

The charge-multiplication circuit 14 may include a plurality of gates or electrodes to transport charge across the CMOS photo sensor 10. In one embodiment, the charge-multiplication circuit 14 includes a plurality of CCD electrodes. The charge transporting circuit 14 may include a first electrode 26, a second electrode 28 and a third electrode 30. The electrodes 26, 28 and 30 may be aligned in series and adjacent the photosensitive element 12. The charge-multiplication circuit 14 may be configured to transfer charge from the photosensitive element 12 to the first electrode 26, introduce a predetermined voltage to the second electrode 28 to induce charge multiplication, transfer the charge from the first electrode 26 to the second electrode 28 for charge multiplication, and transfer a plurality of charge from the second electrode 28 to the third electrode 30 and onto the sense node 21.

For example, the first electrode 26 may be actuated to transfer the signal charge from the photosensitive element 12 to the first electrode 26 by applying a low voltage bias of about 3.3V or less. The second electrode 28 may be actuated to induce charge multiplication by introducing a high voltage of about 20V to the second electrode 28. The high voltage applied to the second electrode 28 triggers the signal charge to transfer from the first electrode 26 to the second electrode 28. Subjected to high voltage bias, the signal charge at the second electrode 28 picks up sufficient energy to knock out valence electrons in the crystalline structure of the CMOS photo sensor 10, thereby multiplying or increasing the signal charge at the second electrode 28. The increased or plurality of charge at the second electrode 28 may then be transferred to the third electrode 30 and onto the sense node 21 by removing the high voltage applied to the second electrode 28 (i.e. collapse the resulting potential well from the applied high voltage) and by actuating the third electrode 30 to transfer the plurality of charge to the third electrode 30 using a low voltage bias of about 3.3V or less.

In one embodiment, the charge-multiplication circuit 14 may be further configured to transfer the plurality of charge back and forth, at least once, from the third electrode 30 to the second electrode 28 for additional charge multiplication. The charge-multiplication circuit 14 may also include a fourth electrode 16 adjacent the third electrode 30, for transferring the plurality of charge from the third electrode 30 to the sense node 21. The charge-multiplication circuit 14 may be, but is not limited to, a surface channel or a buried channel CCD with no implants in between electrodes. It may be fabricated using abutting or overlapping poly-silicon electrodes. In one embodiment of the present invention, it may also be a transistor chain.

The readout circuit 18 may be configured to measure a voltage corresponding to the signal charge transferred to the sense node 21. In one embodiment, the readout circuit 18 may include a reset transistor 23, a supply voltage 22, and a source follower transistor 25. The reset transistor 23 initializes the sense node 21 using the supply voltage 22. The reset transistor 23 and the supply voltage 22 also provide drainage for the signal charge after readout. After initialization, signal charge is transferred from charge-multiplication circuit 14 to the sense node 21, where it causes a potential change at the node 21 with a corresponding readout voltage. The difference between the initialization voltage and the corresponding readout voltage at sense node 21 provides a resultant readout voltage that is outputted to an output circuit via source follower transistor 25. In one embodiment, the readout circuit 18 also includes a select gate 27 for selecting a group of pixels to readout the signal charge.

The reset gate 20 may be located adjacent the photosensitive element 12 and configured to drain excess charge from the photosensitive element 12. In one embodiment, the reset gate 20 may be actuated to drain the excess charge from the photosensitive element 12 after signal charge is transferred to the second electrode 28 from the first electrode 26.

In one embodiment, the CMOS photo sensor 10 may include a transfer gate 15 adjacent the photosensitive element 12, for transferring charge from the photosensitive element 12 to the first electrode 26 of the charge-multiplication circuit 14 and for providing electrical isolation between the charge-multiplication circuit 14 and the photosensitive element 12. The CMOS photo sensor 10 may also include a floating diffusion 31 where the signal charge generates a corresponding signal voltage for readout by the readout circuit 18.

Figure 2:
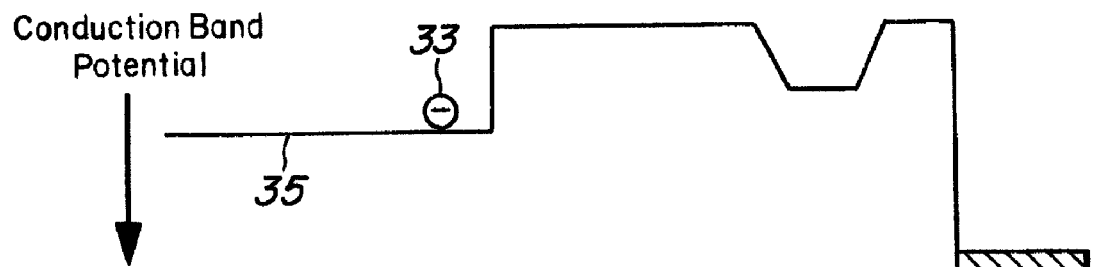
FIGS. 2-6 illustrate charge transport in the charge multiplication CMOS photo sensor of FIG. 1, according to an embodiment of the invention.

FIGS. 2-7 illustrate the charge transport in the charge multiplication CMOS photo sensor 10, according to an embodiment of the invention. The method begins (32) by collecting charge 33 when light 24 strikes the photosensitive element 12 (34). In one embodiment, the photosensitive element 12 collects charge 33 relative to a fixed or pinned Fermi level 35, as shown in FIG. 2. Regardless of the potential next to the photosensitive element 12, the Fermi level 35 of the photosensitive element 12 does not change. The transfer gate 15 may then be clocked high to create a potential well (not shown) underneath the transfer gate 15. This potential well allows the signal charge 33 to transfer to the transfer gate 15 (36).

Figure 3:
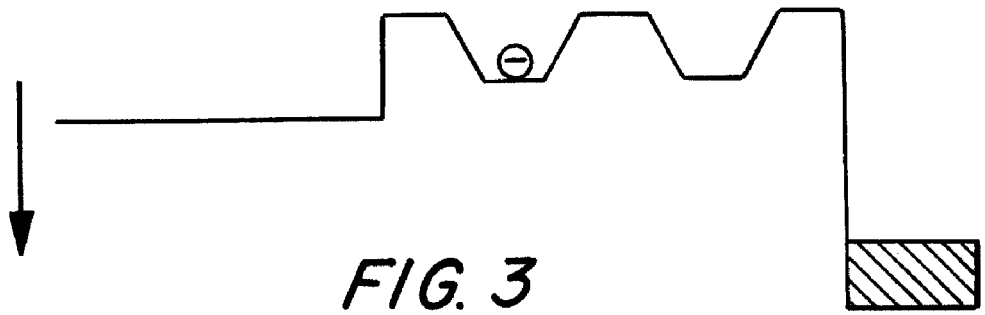

Next, the signal charge 33 may be transferred to the charge-multiplication circuit 14 by clocking high the first electrode 26 during the period where the transfer gate 15 was clocked high (38). For example, the first electrode 26 may be clocked high in or about the middle of the high pulse for the transfer gate 15. By clocking high the first electrode 26, a potential well is formed underneath the first electrode 26, allowing the transfer of signal charge 33 to the first electrode 26, as shown in FIG. 3.

Figure 4:
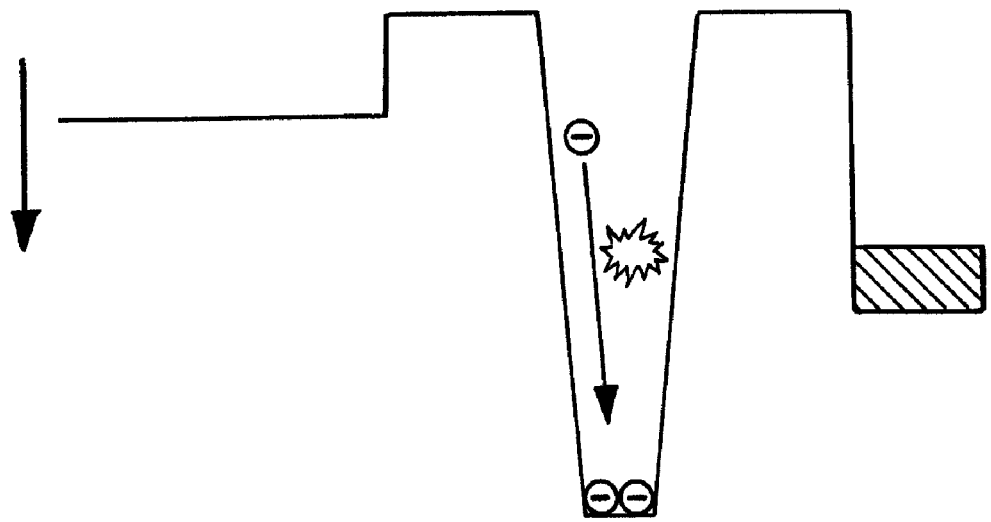

To trigger charge multiplication, a predetermined voltage may then be applied to the second electrode 28, as shown in FIG. 4 (40). The predetermined voltage may be adjustable to define by how much charge is multiplied in a single transfer from the first electrode 26 to the second electrode 28. A higher predetermined voltage provides more gain, a lower predetermined voltage provides less gain. In one embodiment, the predetermined voltage may be high to provide more gain at the expense of a lower full well capacity. In another embodiment, the predetermined voltage may be low to provide less gain but a larger full well capacity. In one embodiment, a high voltage of about 20V, may be applied to the second electrode 28.

The signal charge 33 may then be transferred from the first electrode 26 to the second electrode 28 (42). The potential well underneath the first electrode 26 may be collapsed by clocking low the first electrode 26. Subjected to the high voltage bias, the signal charge 33 at the second electrode 28 gains enough energy, to free electrons from the valence band and elevate them into the conduction band of the CMOS photo sensor 10. This increases the signal charge 33 at the second electrode 28 resulting in a plurality of charge 33.

Figure 5:
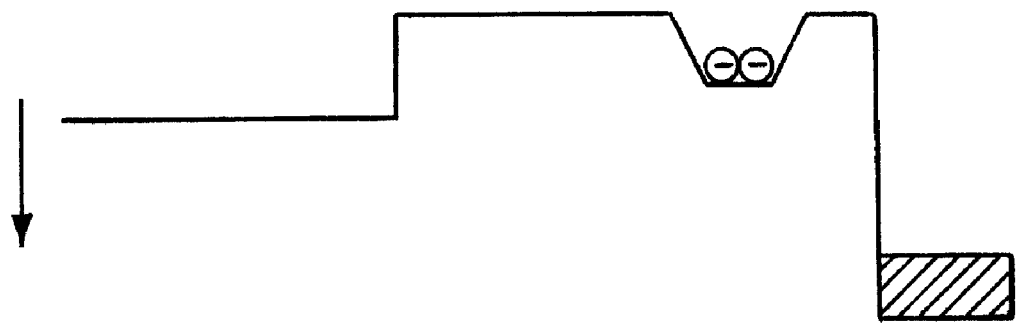

The plurality of charge 33 may then be transferred to the third electrode 30 by clocking the third electrode high and collapsing the potential well underneath the second electrode 28, as shown in FIG. 5 (44). By clocking high the third electrode 30, a potential well is formed underneath the third electrode 30, allowing the transfer of the plurality of charge 33 to the third electrode 30.

Figure 6:
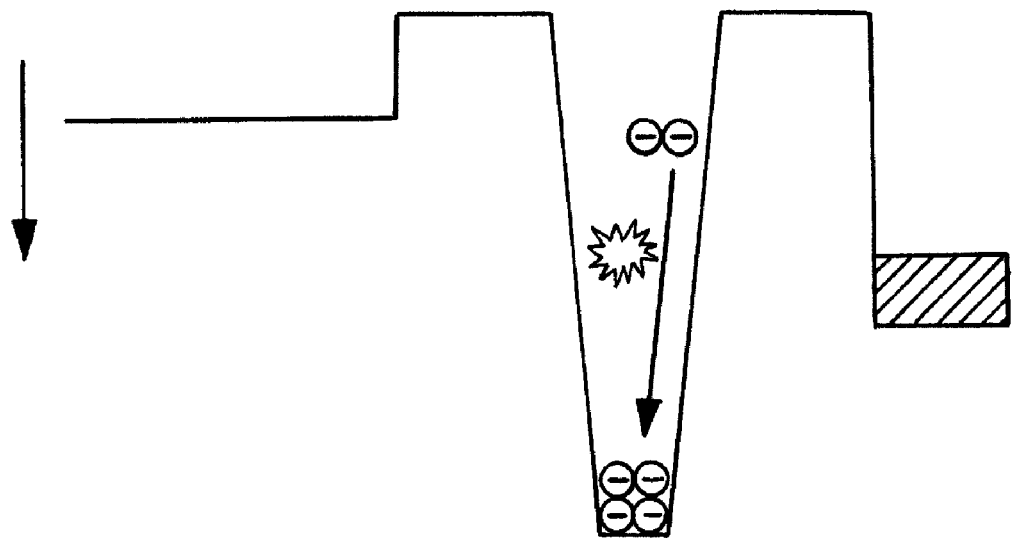
Figure 7:
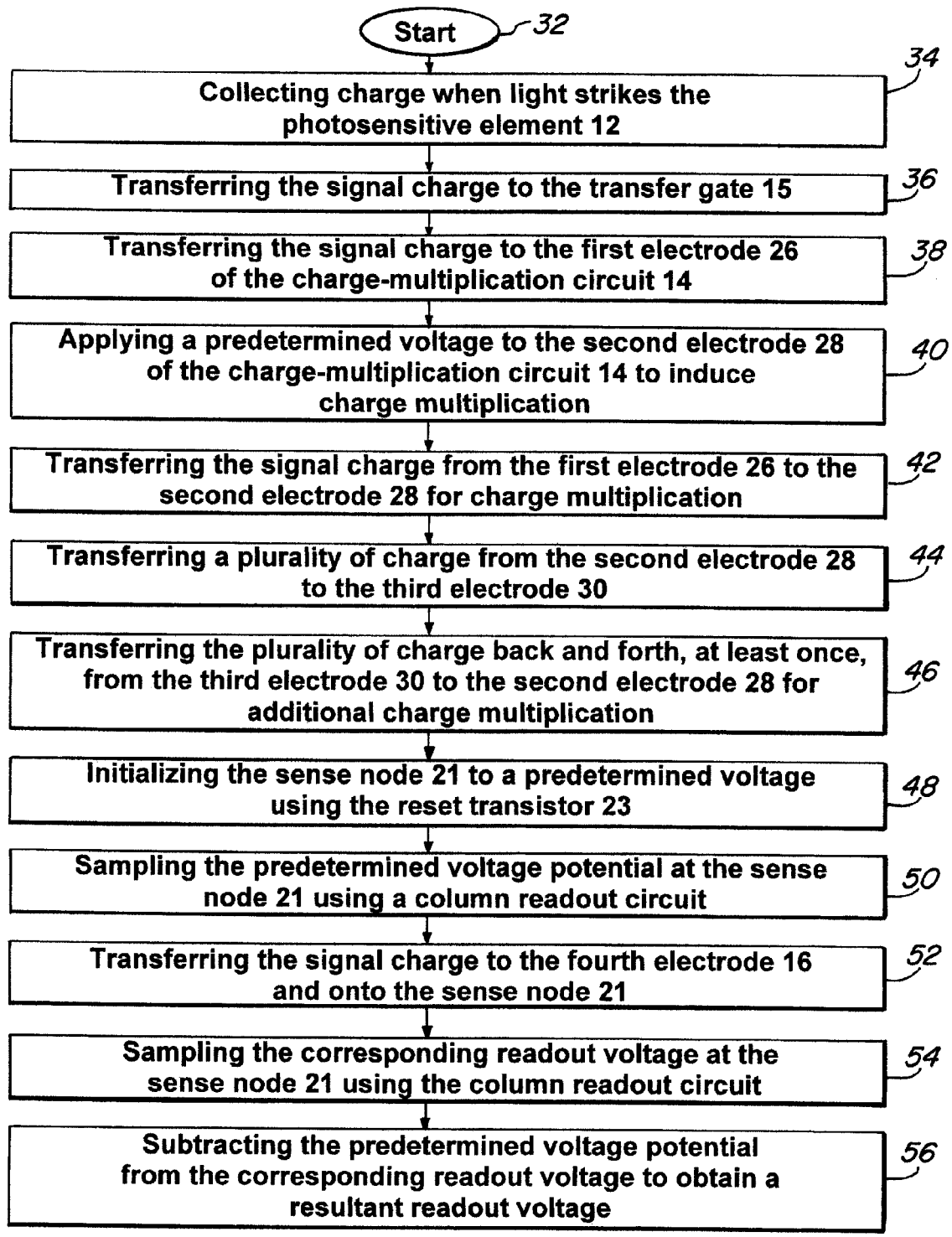
FIG. 7 is an exemplary flow chart outlining the operation of the charge multiplication CMOS photo sensor of FIG. 1, according to one embodiment of the present invention.

In one embodiment, the plurality of charge 33 may then be transferred from the third electrode 30 to the fourth electrode 16 and onto the sense node 21 for readout. In another embodiment, the plurality of charge 33 is transferred back and forth, at least once, from the third electrode 30 to the second electrode 28 for additional charge multiplication (46). For example, the second electrode 28 may be actuated again for additional charge multiplication by applying a predetermined voltage (i.e. 20V) to the second electrode 28, as shown in FIG. 6. The plurality of charge 33 may then be transferred back to the second electrode 28, where it will be subjected again to high voltage bias that causes the plurality of charge 33 to gain enough energy to free electrons from the valence band and elevate them into the conduction band of the CMOS photo sensor 10. The plurality of charge 33 may then be transferred again to the third electrode 30 or the first electrode 26 by clocking the third or first electrode high and collapsing the potential well underneath the second electrode 28 again. This back and forth transfer of the plurality of charge 33 from the third electrode 30 to the second electrode 28 or first electrode 26 may be repeated to achieve a desirable gain.

As can be envisioned by a person skilled in the art, by using the back and forth transfer of the plurality of charges 33 from the third electrode 30 to the second electrode 28, a lower voltage may be applied to the second electrode 28 to induce charge multiplication while achieving a high gain. Since charge multiplication is a stochastic process, the probability for charge multiplication is increased with increasing back and forth transfer frequency. This may be efficiently accomplished through implementation with a plurality of pixels performing back and forth electron multiplication in parallel at substantially the same time.

Once a desired gain is achieved, the plurality of charge 33 may be transferred from the third electrode 30 to the fourth electrode 16 and onto the sense node 21 for readout. Prior to transferring the plurality of charge 33 to the sense node 21, the sense node 21 is initialized with a predetermined voltage potential (48). A reset pointer circuit (not shown) may be used to reset the sense node 21. The reset pointer actuates the reset transistor 23 to reset the sense node 21 by applying the predetermined voltage potential. Once the sense node 21 is reset, the reset transistor 23 is clocked low to allow the reset potential at the sense node 21 to be sampled using a column readout circuit (not shown), such as a column amplifier (50), thereby providing a reference voltage potential $V_{RS}$ for Correlated Double Sampling (CDS). The column readout circuit may be an analog processor configured to perform subtraction of two analog signals.

Next, the plurality of charge 33 is transferred from the fourth electrode 16 to the sense node 21 by collapsing the potential well (not shown) underneath the fourth electrode 16 (52). This allows a corresponding readout voltage $V_{RS}+V_S$ at the sense node 21 to be sampled using a column readout circuit (not shown) (54). The column readout circuit subtracts the predetermined voltage potential $V_{RS}$ from the corresponding readout voltage $V_{RS}+V_S$ to obtain a resultant signal readout voltage $V_S$ (56). This Correlated Double Sampling (CDS) method may be used to eliminate Fixed Pattern Noise (FPN), kTC noise and to reduce 1/f noise contributions. As can be envisioned by a person skilled in the art, other methods of correlated sampling, e.g. subtraction of the signals $V_{RS}$ and $V_{RS}+V_S$ in the digital domain, may be utilized to determine the resultant signal readout voltage $V_S$.

As is understood by a person skilled in the art, the present invention provides an apparatus and method for charge multiplication in a CMOS image or photo sensor 10 for low noise charge domain amplification. The present invention may provide a low noise CMOS image or photo sensor 10 suited for high frame rates. According to one embodiment, the present invention contemplates for electron multiplication in a plurality of pixels of a CMOS image sensor 10 at substantially the same time to achieve high frame rates by integrating charge multiplication CCDs monolithically into a CMOS pixel.

By providing charge multiplication in CMOS image sensors 10, improved imaging capabilities may be achieved, such as, providing low light level imaging, low light level imaging in combination with logic and single chip digital system. As is understood by a person skilled in the art, the present invention provides an apparatus with reduced number of integrated circuits and/or components when integrated into a complete camera system. As can be envisioned by a person skilled in the art, applications for the invention include, but are not limited to, image capture under extremely low light level conditions (i.e. single photon detection capability), digital single chip system night vision imager, compact, lower cost low light level camera, and wide dynamic range for night and day camera. Likewise, applications may also include high frame rate imaging (for example, greater than 100 kHz frame rate). The present invention may also be used for molecule, cell or tissue luminescence in biotechnology and adaptive optics sensor for astronomy.

While the charge multiplication CMOS image sensor and method for charge multiplication have been described in terms of what are presently considered to be the most practical and preferred embodiments, it is to be understood that the disclosure need not be limited to the disclosed embodiments. It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action. Similarly, each physical element disclosed should be understood to encompass a disclosure of the action which that physical element facilitates.

It should be understood that various modifications and similar arrangements are included within the spirit and scope of the claims, the scope of which should be accorded the broadest interpretation so as to encompass all such modifications and similar structures. The present disclosure includes any and all embodiments of the following claims.

The invention claimed is:

1. A pixel for a CMOS photo sensor, comprising:
 a photosensitive element configured to collect charge when light strikes the photosensitive element;
 a charge-multiplication circuit having a first electrode, a second electrode, and a third electrode, the charge-multiplication circuit is configured to:
 transfer the charge from the photosensitive element to the first electrode,
 apply a predetermined voltage to the second electrode to induce charge multiplication,
 transfer the charge from the first electrode to the second electrode for charge multiplication, and
 transfer a plurality of charge from the second electrode to the third electrode and onto a sense node; and
 a readout circuit coupled to the sense node, the readout circuit measures a voltage corresponding to the plurality of charge transferred to the sense node.

2. The pixel of claim 1, further comprising a transfer gate adjacent the photosensitive element, for transferring charge from the photosensitive element to the first electrode of the charge-multiplication circuit and for providing electrical isolation between the charge-multiplication circuit and the photosensitive element.

3. The pixel of claim 1, further comprising a fourth electrode adjacent the third electrode, for transferring the plurality of charge from the third electrode to the sense node.

4. The pixel of claim 3, wherein the charge-multiplication circuit is further configured to transfer the plurality of charge back and forth, at least once, from the third electrode to the second electrode for additional charge multiplication.

5. The pixel of claim 1, further comprising a reset gate adjacent the photosensitive element and configured to drain excess charge from the photosensitive element.

6. The pixel of claim 1, wherein the photosensitive element is selected from a group consisting of a front illuminated photodiode, a backside illuminated photodiode, an avalanche photodiode, a pinned photodiode and a photo gate.

7. The pixel of claim 1, further comprising a reset transistor and a supply voltage to provide drainage for the plurality of charge after the readout circuit measures the voltage corresponding to the plurality of charge transferred to the sense node.

8. The pixel of claim 1, wherein the first electrode, the second electrode, and the third electrode are in series and adjacent the photosensitive element.

9. A method for charge multiplication in an image sensor, the image sensor having a photosensitive element, a first electrode, a second electrode, a third electrode, a sense node and a readout circuit, the method comprising:
   collecting a charge when light strikes the photosensitive element;
   transferring the charge from the photosensitive element to the first electrode;
   applying a predetermined voltage to the second electrode to induce charge multiplication;
   transferring the charge from the first electrode to the second electrode for charge multiplication;
   transferring a plurality of charge from the second electrode to the third electrode;
   transferring the plurality of charge back and forth, at least once, from the third electrode to the second electrode for additional charge multiplication; and
   transferring the plurality of charge to the sense node to generate a corresponding readout voltage.

10. The method of claim 9 further comprising initializing the sense node using a predetermined voltage potential from the readout circuit prior to the step of transferring the signal charge to the sense node.

11. The method of claim 10 further comprising sampling the predetermined voltage potential, sampling the corresponding readout voltage, and subsequently subtracting the predetermined voltage potential from the corresponding readout voltage to obtain a resultant readout voltage.

12. The method of claim 9, wherein the image sensor further comprises a fourth electrode adjacent the third electrode.

13. The method of claim 12 further comprising transferring the plurality of charge from the third electrode to the fourth electrode prior to the step of transferring the plurality of charge to the sense node to generate a corresponding readout voltage.

14. The method of claim 9 further comprising removing the applied predetermined voltage to the second electrode to transfer the plurality of charge from the second electrode to the third electrode.

15. A pixel for CMOS image sensor comprising:
   a photosensitive element configured to collect charge when light strikes the photosensitive element;
   a charge-multiplication circuit having a first electrode, a second electrode, a third electrode, and a fourth electrode, the charge-multiplication circuit is configured to:
   transfer the charge from the photosensitive element to the first electrode,
   introduce a predetermined voltage to the second electrode to induce charge multiplication,
   transfer the charge from the first electrode to the second electrode for charge multiplication,
   transfer a plurality of charge from the second electrode to the third electrode,
   transfer the plurality of charge back and forth, at least once, from the third electrode to the second electrode for additional charge multiplication, and
   transfer the plurality of charge from the third electrode to the fourth electrode and onto a sense node; and
   a readout circuit coupled to the sense node, the readout circuit measures a voltage corresponding to the plurality of charge transferred to the sense node.

16. The pixel of claim 15, further comprising a transfer gate adjacent the photosensitive element, for transferring charge from the photosensitive element to the first electrode of the charge-multiplication circuit and for providing electrical isolation between the charge-multiplication circuit and the photosensitive element.

17. The pixel of claim 15, further comprising a reset gate adjacent the photosensitive element and configured to drain excess charge from the photosensitive element.

18. The pixel of claim 15, further comprising a reset transistor and a supply voltage to provide drainage for the plurality of charge after the readout circuit measures the voltage corresponding to the plurality of charge transferred to the sense node.

19. The pixel of claim 15, wherein the first electrode, the second electrode, the third electrode and the fourth electrode are in series and adjacent the photosensitive element.

* * * * *